US006829402B2

United States Patent
Saito

(10) Patent No.: US 6,829,402 B2
(45) Date of Patent: Dec. 7, 2004

(54) OPTICAL SWITCH AND METHOD OF MANUFACTURING THE SAME

(75) Inventor: Takeshi Saito, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 67 days.

(21) Appl. No.: 10/211,363

(22) Filed: Aug. 5, 2002

(65) Prior Publication Data

US 2003/0147583 A1 Aug. 7, 2003

(30) Foreign Application Priority Data

Feb. 1, 2002 (JP) ........................................ 2002-025465

(51) Int. Cl.[7] .............................. G02B 6/36; G02B 6/10
(52) U.S. Cl. .............................. 385/17; 385/50; 385/88; 385/129
(58) Field of Search .............................. 385/91, 16–22, 385/88, 89, 129–132, 50

(56) References Cited

U.S. PATENT DOCUMENTS

| | | | | |
|---|---|---|---|---|
| 5,197,109 | A | * 3/1993 | Ichigi et al. ................... | 385/50 |
| 5,784,509 | A | 7/1998 | Yamane et al. | |
| 5,960,131 | A | * 9/1999 | Fouquet et al. ................ | 385/17 |
| 6,195,478 | B1 | * 2/2001 | Fouquet ......................... | 385/17 |
| 6,655,856 | B2 | * 12/2003 | Nakanishi et al. ............. | 385/94 |
| 2001/0055461 | A1 | * 12/2001 | Tomaru et al. .............. | 385/143 |
| 2002/0041739 | A1 | * 4/2002 | Wu .............................. | 385/88 |

FOREIGN PATENT DOCUMENTS

| | | |
|---|---|---|
| JP | 57-163205 | 10/1982 |
| JP | 60-222816 | 11/1985 |
| JP | 4-52605 | 2/1992 |
| JP | 2000-162469 | 6/2000 |

OTHER PUBLICATIONS

J.E. Fouquet, "Compact optical cross–connect switch based on total internal reflection in a fluid–containing planar lightwave circuit", Optical Fiber communication Conference, Mar. 7, 2000.
Related U.S. application No. 09/836,179, filed Apr. 18, 2001 (Our Ref. No.: 57454–076).

* cited by examiner

Primary Examiner—Craig E. Church
Assistant Examiner—Krystyna Suchecki
(74) Attorney, Agent, or Firm—McDermott Will & Emery LLP

(57) ABSTRACT

An optical switch comprises a sheet-type main member including a plurality of optical waveguides linearly extending to intersect with each other on a plurality of intersections and an optical fiber member, while the main member and the optical fiber member are connected with each other through a connection member. The main member has notches provided to traverse the optical waveguides. The connection member includes a plurality of optical waveguides linearly extending for transferring optical signals between the optical waveguides and the optical fiber member therein. The main member and the connection member are divided from a continuous member on the same substrate, while the optical waveguides are obtained by dividing continuous optical waveguides on the same substrate.

6 Claims, 14 Drawing Sheets

OPTICAL SWITCH AND METHOD OF MANUFACTURING THE SAME

BACKGROUND OF THE INVENTION

1. Field of the Invention

The present invention relates to an optical switch employed for switching optical paths in an optical communication system and a method of manufacturing the same.

2. Description of the Background Art

A conventional optical switch 90 will be described with reference to FIG. 21. This optical switch 90 is one shown in TuM1 (J. E. Fouquet, "Compact optical cross-connect switch based on total internal reflection in a fluid-containing planner lightwave circuit") at OFC 2000 (Optical Fiber communication Conference, Mar. 7, 2000). Optical switch 90 is formed by a silica planar optical circuit substrate 51, where a two-dimensional optical circuit is formed by providing a rectangular optical waveguide having a slightly high refractive index within silica planar optical circuit substrate 51. Generally, silica planar optical circuit substrate 51 having a refractive index of about 1.5 is employed, while optical waveguide 91 portion is made of a material with a refractive index that is higher by about 1%. The portion of optical waveguide 91 is in general also referred to as a "core." A trench 52 is formed such that it traverses a position that partially overlaps with a crosspoint of optical waveguide 91, and trench 52 is filled with refractive index-matching oil 56. Refractive index-matching oil 56 is oil having a refractive index equal to that of optical waveguide 91.

An operation of optical switch 90 will be described. In optical switch 90, a bubble generating mechanism, not shown, is provided which can generate a bubble 53 and also make bubble 53 disappear in the liquid of refractive index-matching oil 56 at a cross point of optical waveguide 91. For the bubble generating mechanism, as that used for a head of bubble-jet printer may be employed.

When bubble 53 is generated at a crosspoint, a light that enters into the crosspoint is totally reflected by a surface of bubble 53, while when no bubble 53 exists, the light travels in a straight line because optical waveguide 91 and refractive index-matching oil 56 have an equal refractive index. By utilizing this property, an optical path can be switched between two states of reflection/straight travel by generation/disappearance of bubble 53.

In optical switch 90 formed in the above-described manner, accuracy of an etching process requires a width of trench 52 to be at least about 15 μm. In addition, there is a problem of optical loss of at least 0.07 dB per crosspoint. On the other hand, optical loss L [dB] of optical switch 100 as a whole is given by the following formula:

$$L = 2C + (m-1)T + (n+1)T + R,$$

where m is a number of input ports, n is a number of output ports,

C is a loss [in dB] upon entry of a light into an optical switch from an optical fiber and during travel through an optical waveguide to an active area which is a crosspoint, T is a loss [in dB] upon traversing one trench and during transmission through a section of a short optical waveguide between two crosspoints, and R is a loss [in dB] for reflection upon a sidewall of an empty trench and transmission through a section of a short optical waveguide between two crosspoints.

For instance, when configuring a large-scale 1000×1000 optical switch, specific numerical values substituted into the above formula give L=2×0.25+(1000−1)×0.07+(1000−1)×0.07+2.1=142.46 dB. Thus, even with an ideal produced optical switch, optical loss of 142.26 dB would occur. It is necessary to limit optical loss L to 10 dB or below in order for an optical switch to function without degrading signal quality. In this manner, there is a disadvantage in that a larger scale than about 32×32 is difficult to form with such type of configuration when optical loss is considered.

Moreover, silica planar optical circuit substrate 51 is produced by a device similar to that which produces a semiconductor so that a large optical switch would disadvantageously become extremely expensive to produce. Further, since bubble 53 is produced and utilized each time it is needed in refractive index-matching oil 56, there is a problem of optical switching malfuntion occuring when the generated bubble 53 is too small or when the bubble is generated out of position. Furthermore, depending on the condition of refractive index-matching oil 56, local absorption of light would take place with a small globule of refractive index-matching oil 56 such that an optical path in its periphery would disadvantageously burn due to the energy of a signal light.

SUMMARY OF THE INVENTION

An object of the present invention is to provide an optical switch and a method of manufacturing the same that make accurate connect between optical waveguides and optical fiber members possible with easy operation, at the same time, providing an optical switch that facilitates production, that can be formed in large scale with little optical loss, and that does not involve switching malfunction or burning as described above.

In order to attain the aforementioned object, the optical switch according to the present invention comprises a sheet-type main member including a plurality of first optical waveguides linearly extending to intersect with each other on a plurality of intersections therein and optical waveguide means, while the aforementioned main member and the aforementioned optical waveguide means are connected with each other through a connection member, the aforementioned main member has notches provided to traverse the aforementioned first optical waveguides, the aforementioned connection member includes a plurality of second optical waveguides linearly extending for transferring optical signals between the aforementioned first optical waveguides and the aforementioned optical waveguide means therein, the aforementioned main member and the aforementioned connection member are divided from a member continuously formed on the same substrate, and the aforementioned first optical waveguides and the aforementioned second optical waveguides are obtained by dividing optical waveguides continuously formed on the same substrate. According to this structure, the optical switch is formed by re-connecting members divided from a continuous member with each other, whereby the optical waveguides can be correctly aligned with each other along the perpendicular direction by a simple method in the optical switch.

According to the present invention, a mark for relatively aligning the aforementioned main member and the aforementioned connection member with each other is preferably arranged on the connected portion between the aforementioned main member and the aforementioned connection member. According to this structure, the main member and the connection member can be aligned with each other while visually recognizing the mark for connecting the members with each other, whereby the optical waveguides can be readily horizontally aligned with each other in the optical switch.

In order to attain the aforementioned object, the method of manufacturing an optical switch according to the present invention comprises an optical waveguide forming step of forming a polymer layer including an optical waveguide therein on the surface of a substrate, a polymer layer dividing step of dividing the aforementioned polymer layer into a main member and a connection member, and a member connecting step of connecting the aforementioned main member and the aforementioned connection member with each other. According to this method, the single polymer layer is divided into the main member and the connection member, which in turn are thereafter re-connected with each other, whereby optical waveguides can be aligned with each other through a simple operation.

According to the present invention, the method preferably further includes a subassembly assembling step of obtaining a subassembly by connecting the aforementioned connection member with optical waveguide means after the aforementioned polymer layer dividing step and before the aforementioned member connecting step and a notch forming step of forming a notch to traverse the aforementioned optical waveguide in the aforementioned main member, and the aforementioned member connecting step preferably connects the aforementioned subassembly and the aforementioned main member with each other thereby connecting the aforementioned main member and the aforementioned connection member with each other. According to this method, correct alignment can be readily performed without introducing light.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
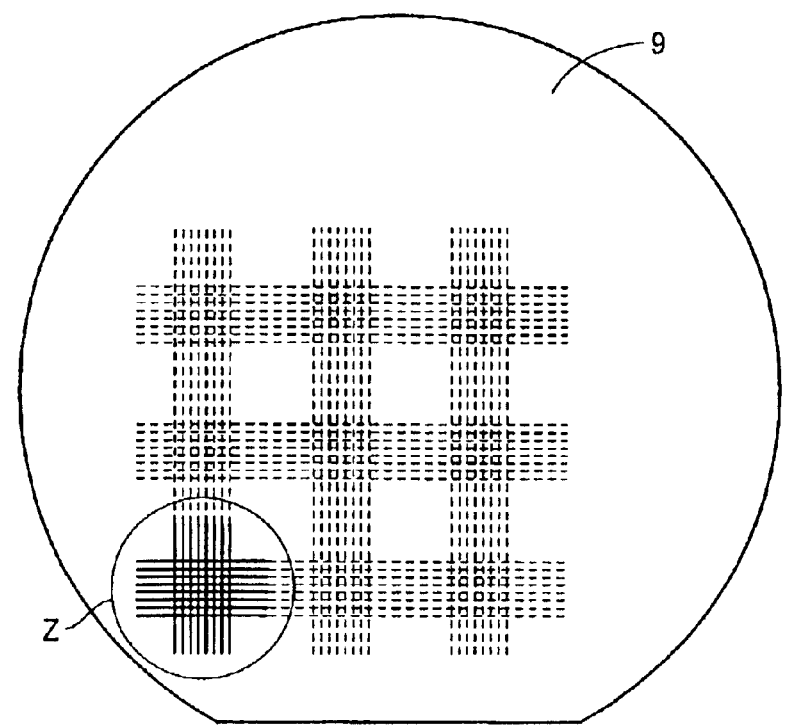
FIG. 1 is a plan view of a wafer employed in a method of manufacturing an optical switch according to a first embodiment of the present invention.

Prior to the specific description of the embodiments of the present invention, an optical switch developed uniquely by the inventors of the present invention will be described. The inventors tried hard to solve the above described problems of the prior art, and succeeded to develop such an optical switch 100 as shown in FIG. 17.

The optical switch 100 will be described in the following with reference to FIG. 17. The optical switch 100 is formed by holding a polymer sheet 201 between keep plates 231 and 232. Optical waveguides 211 made of a material having a higher refractive index than the remaining portions of the polymer sheet 201 are arranged in the polymer sheet 201 in the form of a lattice. Notches 213 are provided on the surface of the polymer sheet 201 is to traverse the intersections between the optical waveguides 211. The keep plates 231 and 232 are provided with openings to expose the notches 213 respectively. These openings define ports 228a, 228b, 228c and 228d for switching optical paths.

Figure 17:
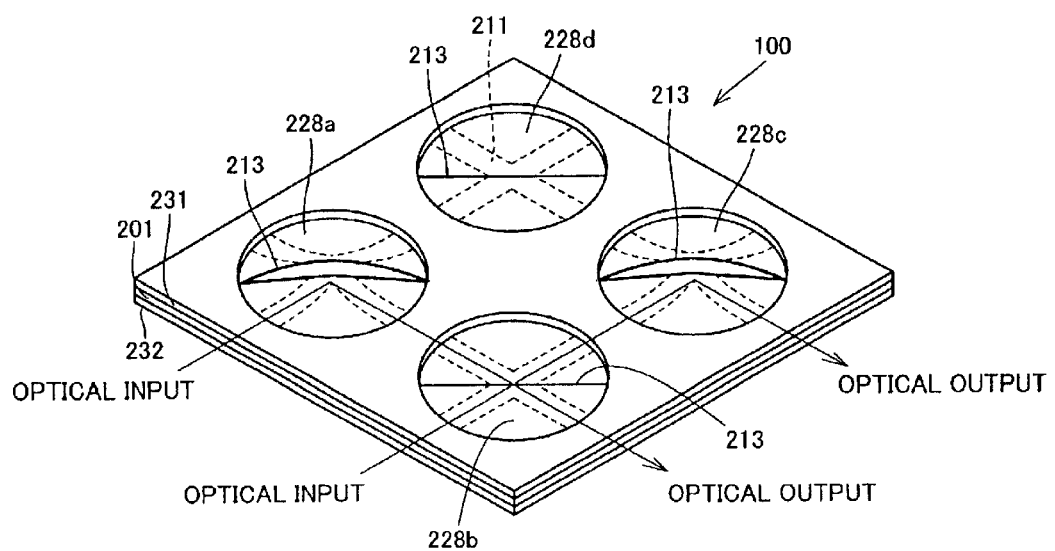
FIG. 17 is an explanatory diagram of an optical switch according to related art as a basis of the present invention.
Figure 18:
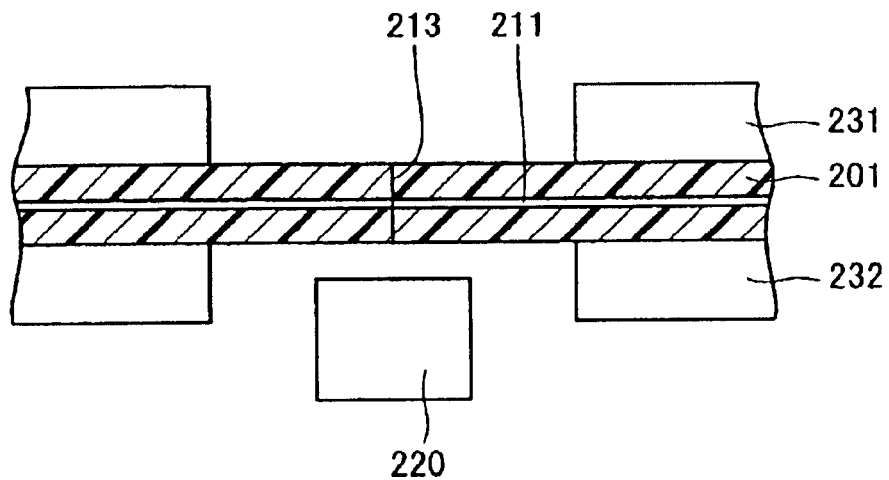
FIG. 18 is a first sectional view of a portion around each port of the optical switch according to the related art as a basis of the present invention.
Figure 19:
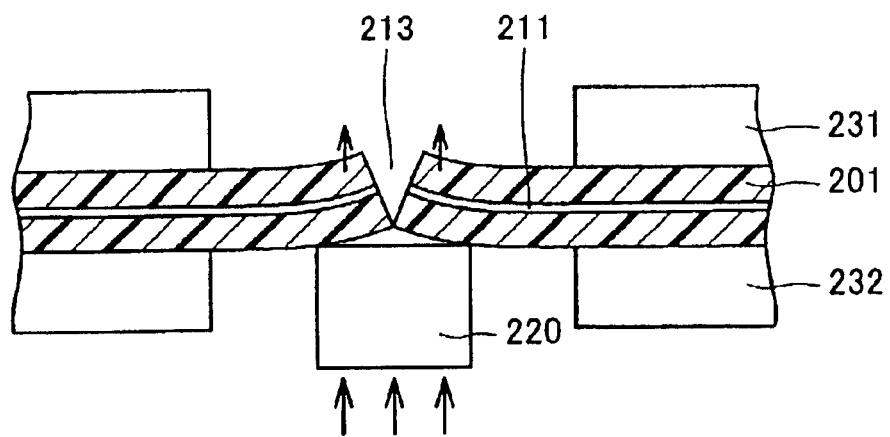
FIG. 19 is a second sectional view of the portion around each port of the optical switch according to related art as a basis of the present invention.

Optical signals are incident upon the optical waveguides 211 of the polymer sheet 201 from the lower left side of FIG. 17, as shown by arrows. FIGS. 18 and 19 are sectional views showing a portion around each port. In each port, the optical path can be selected by pushing up the polymer sheet 201 with a rod 220 serving as driving means. When the polymer sheet 201 is not pushed up as shown in FIG. 18, the notch 213 of the polymer sheet 201 is closed and hence the optical waveguides 211 remain continuous to pass the optical signal as such. When the polymer sheet 201 is pushed up with the rod 220 as shown in FIG. 19, however, the notch 213 is opened to separate the optical waveguides 211 from each other, whereby the optical signal is reflected by the boundary between the optical waveguides 211 and the air. This notch 213 is formed on the intersection between the optical waveguides 211, and hence the reflected optical signal changes its course at this time.

Referring to FIG. 17, the polymer sheet 201 is pushed up only on the ports 228a and 228c, to open the notches 213. Therefore, the ports 228a and 228c reflect the optical signals while the ports 228b and 228d linearly pass the optical signals as such without reflection. Thus, the optical switch 100 can select one of a plurality of outlets for outputting an optical signal incident upon one of a plurality of inlets by operating the driving means.

FIG. 17, showing only four ports 228a, 228b, 228c and 228d, illustrates a part of the optical switch 100 in an enlarged manner. In practice, the optical switch 100 is provided with a larger number of ports and a larger number of optical waveguides 211.

Such an optical switch 100 can select the destination of each optical signal through a simple operation in a compact structure. In order to use the optical switch 100 in practice, however, optical fiber members or the like must be connected to portions of the optical waveguides 211 exposed on end surfaces as optical waveguide means for inputting/outputting optical signals.

Figure 20:
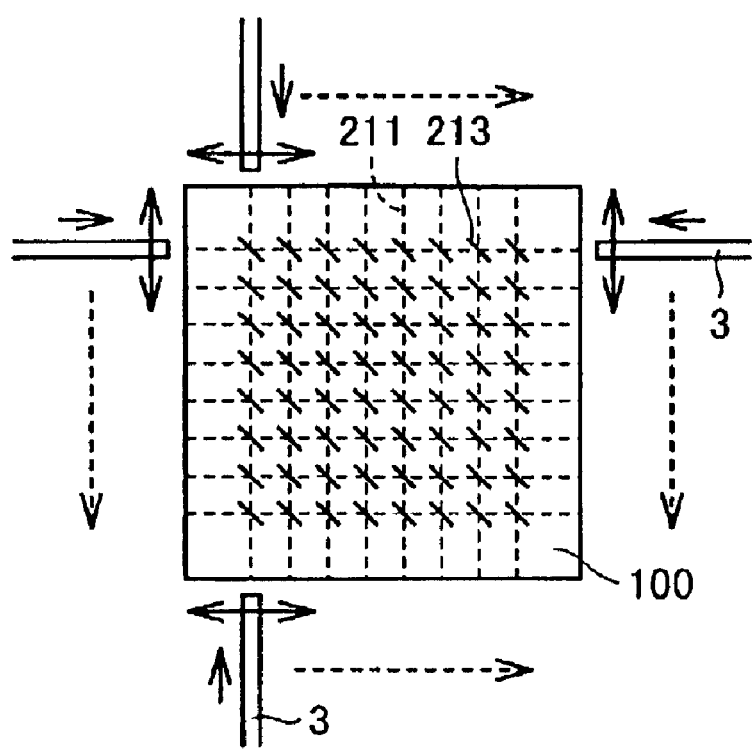
FIG. 20 is an explanatory diagram of optical axis adjustment for manufacturing the optical switch according to the related art as a basis of the present invention
Figure 21:
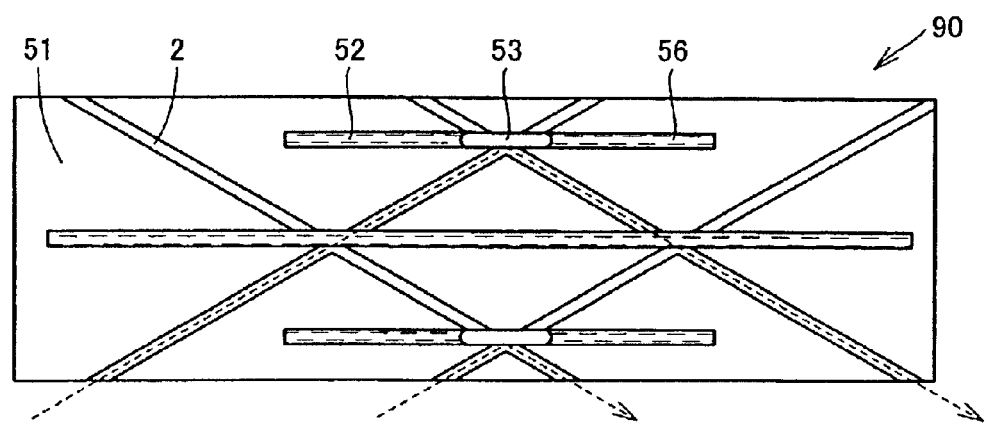
FIG. 21 is a cross section of the optical switch in accordance with the prior art.

The optical fiber members may be connected either before or after forming the notches 213 on the surface of the optical switch 100. In the former case, the optical fiber members disadvantageously hinder formation of the notches 213, leading to difficulty in handling. In the latter case, the following methods may be employable:

First, the optical axes may be adjusted as to the respective ones of the optical fiber members. As shown in FIG. 20, optical fiber members 3 are approached to input end surfaces of the optical switch 100 while approaching other optical fiber members for detecting outgoing beams on output end surfaces, for introducing light from the optical fiber members 3 in practice, finely adjusting the positions of the optical fiber members 3 for finding positions maximizing the quantities of the detected outgoing beams and bonding the optical fiber members 3 to the optical switch 100.

In this method, however, the light linearly passing through the optical switch 100 along the optical waveguides 211 outgoes through a plurality of intersections. Therefore, the light is slightly subjected to refraction, reflection and scattering when passing through the respective intersections, to leak to portions of the polymer sheet 201 other than the optical waveguides 211. As viewed from the output end surfaces, the beams are detected in spread states, leading to difficulty in correct alignment of the optical fiber members 3. Further, the optical fiber members 3 must be aligned one by one, leading to a complicated step.

In order to solve this problem, Japanese Patent Laying-Open No. 2000-162469 proposes a method of aligning optical fiber members with optical waveguides by preparing an optical fiber array previously holding a plurality of optical fiber members at a pitch corresponding to that of the optical waveguides and finely adjusting the position of the optical fiber array. In this method, however, the optical switch including the optical waveguides and the optical fiber array are separate components, and hence the relation between the pitches of the optical waveguides and the optical fiber members held in the optical fiber array must be strictly controlled. The height for holding the optical fiber members in the optical fiber array must also be strictly controlled. While this method may be advantageous for alignment in a direction parallel to the surface of the optical switch, it is difficult to recognize the height of the optical waveguides in the optical switch, leading to difficulty in alignment along the perpendicular direction.

U.S. Pat. No. 5,784,509 also proposes a method of performing alignment by arranging optical waveguides on a substrate, forming V-shaped grooves for receiving optical fiber members on the same substrate and engaging the optical fiber members in the V-shaped grooves. In this method, however, the substrate employed for forming a polymer sheet serves also as a keep plate as such, and the substrate located under the polymer sheet must be perforated in order to form the aforementioned ports. However, it is difficult to precisely perforate the substrate in alignment with the positions of the intersections between the optical waveguides without flawing the polymer sheet.

As hereinabove described, there has been no proper method for readily correctly connecting optical waveguides provided in an optical switch with optical fiber members.

Embodiments of the present invention will be described with reference to FIGS. 1 to 16.

(First Embodiment)

Figure 2:
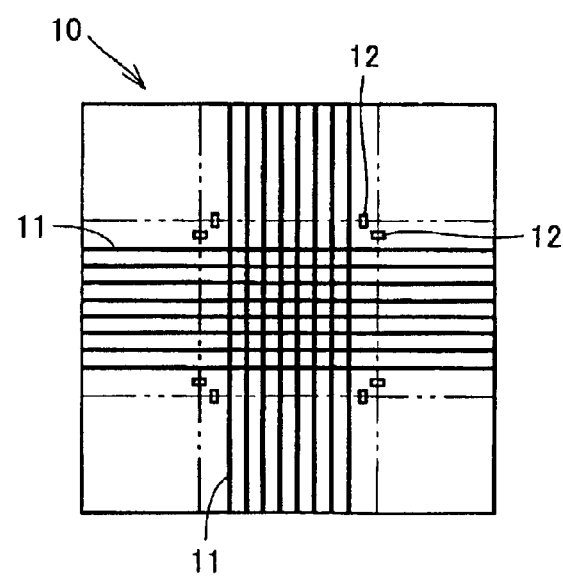
FIG. 2 is a plan view of a unit piece cut in a step included in the method of manufacturing an optical switch according to the first embodiment of the present invention.
Figure 3:
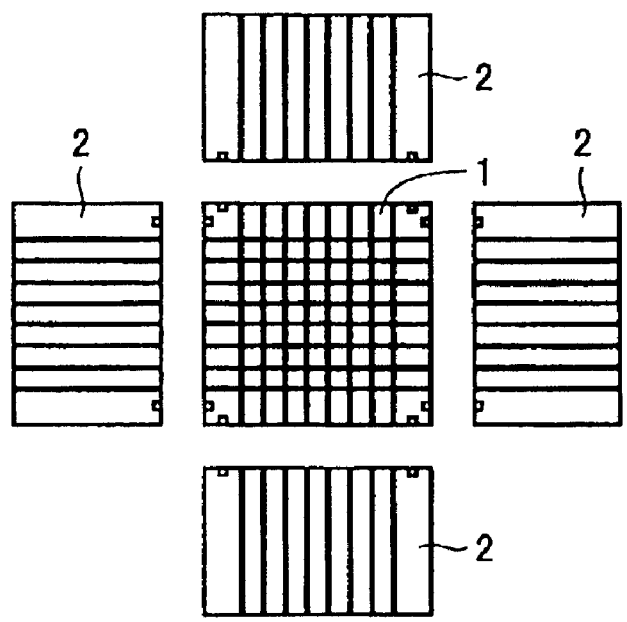
FIG. 3 is an explanatory diagram of the unit piece divided in a step included in the method of manufacturing an optical switch according to the first embodiment of the present invention.

A method of manufacturing an optical switch according to a first embodiment of the present invention is described with reference to FIGS. 1 to 9. First, polymer resin is applied onto the surface of a substrate 9 such as a silicon wafer, for forming a polymer layer. Further, another polymer layer having a different refractive index is stacked thereon, patterned to remain in the form of a lattice, and covered with still another polymer layer having the same refractive index as the first polymer layer. Thus, a polymer sheet including optical waveguides therein is formed on the substrate 9, as shown in FIG. 1. The portion of this polymer sheet is separated and cut into each unit piece 10, as shown in FIG. 2. In order to obtain the unit piece 10, the substrate 9 may be cut before separating the polymer sheet therefrom. The polymer sheet may be separated from the substrate 9 at a proper point in a later step. In the unit piece 10, a plurality of optical waveguides 11 intersect with each other, as shown in FIG. 2. FIGS. 1 to 3 show the optical waveguides 11, which are hidden in the polymer sheet in practice and must be shown by broken lines, with solid lines for convenience of illustration.

The unit piece 10 is further cut along two-dot chain lines shown in FIG. 2, for dividing the polymer sheet into a main member 1 and connection members 2 as shown in FIG. 3. In advance of this cutting, marks 12 are preferably formed by metal patterns or the like to extend over the cutting lines, as shown in FIG. 2. Thus, the marks 12 remain in the main member 1 and the connection members 2 respectively after the division, as shown in FIG. 3. These marks 12 are employed for alignment when connecting the main member 1 and the connection members 2 with each other in a later step. In the following description, it is assumed that numeral 11a denotes the optical waveguides present in the main member 1 and numeral 11b denotes those present in the connection members 2 respectively.

The position for forming each mark 12 is preferably separated from an endmost optical waveguide as viewed from the cross direction with respect to a bulk material (hereinafter referred to as "optical waveguide string"), including a plurality of optical waveguides arranged in parallel with each other at a regular pitch, by at least half the pitch between the optical waveguides included in the optical waveguide string. In this case, influence exerted on the optical characteristics of the optical waveguides by stress resulting from film formation can be reduced when the marks 12 are formed by metal films or the like.

Figure 4:
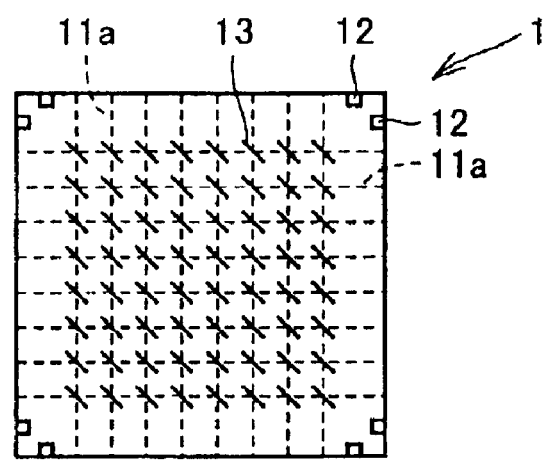
FIG. 4 is a plan view of a main member obtained in a step included in the method of manufacturing an optical switch according to the first embodiment of the present invention.
Figure 5:
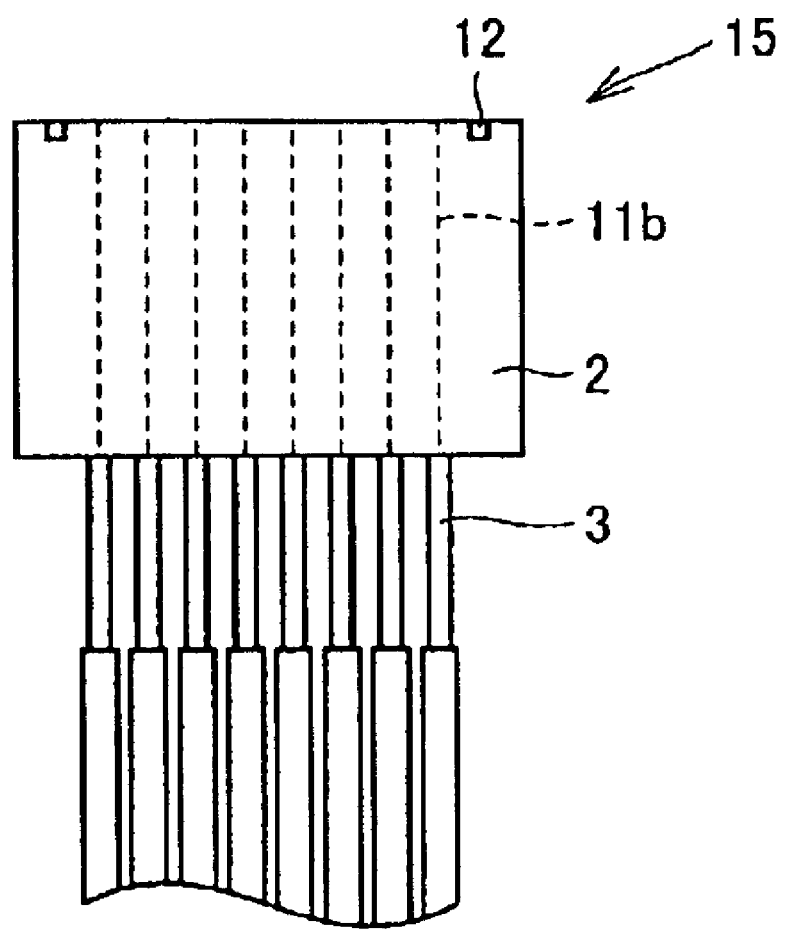
FIG. 5 is a plan view of a subassembly obtained in a step included in the method of manufacturing an optical switch according to the first embodiment of the present invention.

As shown in FIG. 4, notches 13 are formed on the surface of the main member 11. These notches 13 are formed on positions corresponding to the intersections between the optical waveguides 13a to traverse the intersections. As shown in FIG. 5, optical fiber members 3 are connected to the optical waveguides 11b of each connection member 2 respectively, thereby obtaining a subassembly 15. The optical fiber members 3 are employed for inputting/outputting optical signals in/from the optical switch.

Figure 6:
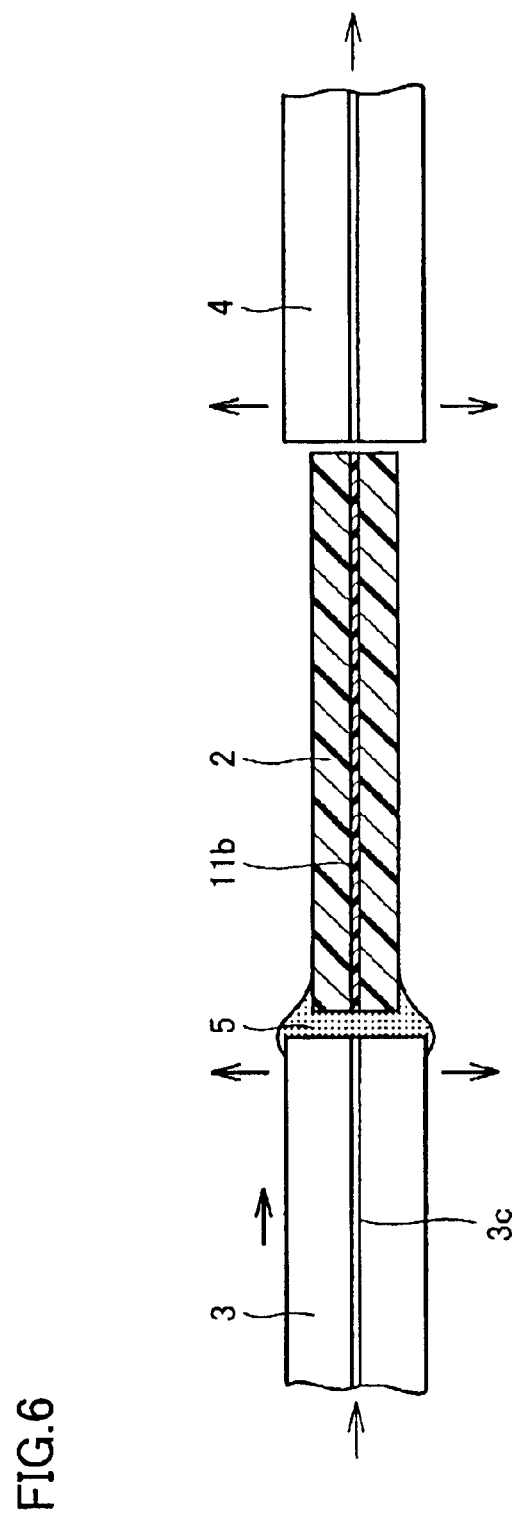
FIG. 6 is a first explanatory diagram of a method of connecting a connection member and optical fiber members with each other in a step included in the method of manufacturing an optical switch according to the first embodiment of the present invention.
Figure 7:
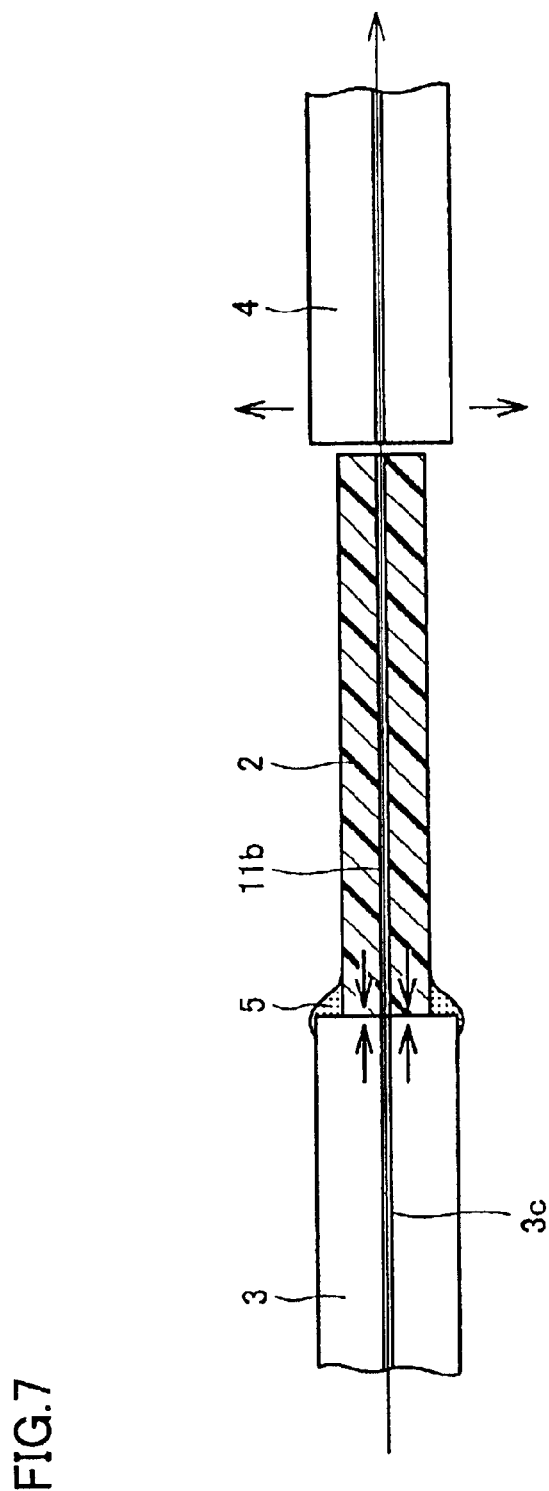
FIG. 7 is a second explanatory diagram of the method of connecting the connection member and the optical fiber members with each other in the step included in the method of manufacturing an optical switch according to the first embodiment of the present invention.

A method of connecting the optical waveguides 11b and the optical fiber members 3 is described with reference to FIGS. 6 and 7. As shown in FIG. 6, each optical fiber member 3 is approached to the connection member 2 while defining a small clearance therebetween, and ultraviolet-cured resin (hereinafter referred to as "UV-cured resin") 5 is infiltrated into this clearance. The UV-cured resin 5 preferably has a refractive index between those of the optical waveguides 11b and a core 3c of the optical fiber member 3. Thus, the quantity of reflected return light can be reduced between the core 3c and the UV-cured resin 5 or between each optical waveguide 11b and the UV-cured resin 5. In this state, an optical fiber member 4 for optical axis adjustment is set on an end of the connection member 2 opposite to the optical fiber member 3, as shown in FIG. 6. An optical signal is introduced from the optical fiber member 3 for finely adjusting the relative position of the optical fiber member 3 with respect to the connection member 2 while detecting light outgoing from the opposite side with the optical fiber member 4 for optical axis adjustment. On a position maximizing the quantity of the outgoing light, the connection member 2 and the optical fiber member 3 are pressed against each other to slightly apply force to each other, as shown in FIG. 7. In this state, ultraviolet light (UV light) is applied for curing the UV-cured resin 5. While the UV-cured resin 5 is generally contracted when the same is cured, the connection member 2 and the optical fiber member 3, which are pressed against each other with frictional force acting in a direction parallel to the contact surface, are hardly displaced from each other following such contraction of the UV-cured resin 5. In the aforementioned procedure, the optical fiber members 3 are connected to the connection member 2 by a necessary number. Thus, the subassembly 15 can be obtained.

Figure 8:
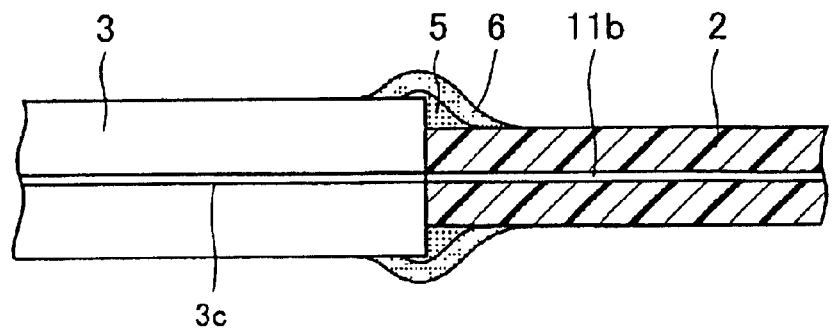
FIG. 8 is an explanatory diagram showing exemplary connection performed in the method of manufacturing an optical switch according to the first embodiment of the present invention.

As shown in FIG. 8, the connection member 2 and the optical fiber members 3 are preferably further overcoated with an adhesive 6 such as thermosetting resin every time each optical fiber member 3 is connected to the connection member 2 or after all optical fiber members 3 are connected to the connection member 2, for reinforcing the strength.

Figure 9:
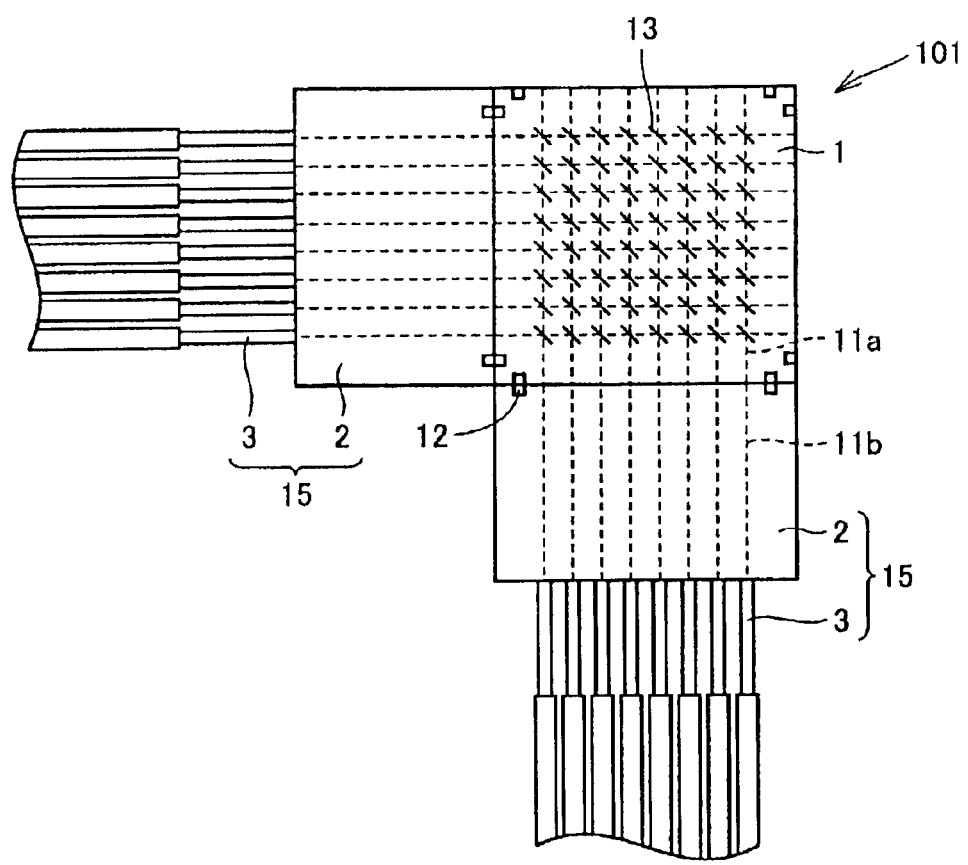
FIG. 9 is a plan view showing an exemplary optical switch assembled according to the method of manufacturing an optical switch according to the first embodiment of the present invention.

Then, the main member 1 and the subassembly 15 are connected with each other as shown in FIG. 9. The optical waveguides 1a and 11b are connected with each other due to this connection. Alignment necessary for correctly connecting the optical waveguides 11a and 11b with each other can be readily performed by recognizing and matching the positions of the marks 12 remaining on the main member 11 and the connection member 2 of the subassembly 15 respectively with each other.

However, the alignment may not be performed through the marks 12 if the positions of the optical waveguides 11a and 11b can be recognized and aligned with each other through some method without employing the marks 12.

As shown in FIG. 9, an optical switch 101 already connected with the optical fiber members 3 for inputting/outputting optical signals can be obtained by assembling the main member 1 and the subassemblies 15 with each other.

The main member 1 and the connection members 2 are divided from the continuous unit piece 10 formed on the same substrate 9 while the optical waveguides 11a and 11b are also divided from the optical waveguides 11 (see FIG. 2) continuously formed in the continuous member formed on the same substrate 9. When the main member 1 and the connection members 2 are connected with each other, therefore, the plane positions of the optical waveguides 11a and 11b can be readily matched with each other at the same time with no consideration on errors in the pitch between the optical waveguides 11a and 11b or the like.

The connection members 2 and the optical fiber members 3 are previously assembled into the subassemblies 15, which in turn are connected with the main member 1. Therefore, alignment of the cores 3c of the optical fiber members 3 and the optical waveguides 11a of the main member 1 may not be taken into consideration. While optical axis adjustment similar to that between the optical switch 100 and the optical fiber members 3 in the prior art (see FIG. 20) is performed for connecting the connection members 2 and the optical fiber members 3 with each other, the optical signal for the optical axis adjustment passes not through the main member 1 having a plurality of intersections on the optical path but through each connection member 2 (see FIG. 6) having no intersection, and hence no light leaks to portions other than the optical waveguides 11a and 11b, dissimilarly to the case of the optical axis adjustment in the conventional optical switch 100.

The main member 1 and the connection members 2 are divided from the continuous unit piece 10 formed on the same substrate 9 while the optical waveguides 11a and 11b are also divided from the optical wave guides 11 (see FIG. 2) continuously formed in the continuous member formed on the same substrate 9, whereby the positions of the optical waveguides 11a and 11b can also be readily matched with each other along the cross direction. Thus, the optical waveguides 11a and 11b can be readily aligned with each other not only in the plane direction but also in the cross direction.

The optical switch 101 having the structure shown in FIG. 9 can be manufactured by the aforementioned method, thereby implementing an optical switch capable of correctly connecting optical waveguides and optical fiber members with each other through a simple operation.

(Second Embodiment)

A method of manufacturing an optical switch according to a second embodiment of the present invention is now described. According to the second embodiment, steps similar to those of the first embodiment described with reference to FIGS. 1 to 8 are carried out. The second embodiment is described with reference to another method applicable for connecting a main member 1 similar to that shown in FIG. 4 and each subassembly 15 similar to that shown in FIG. 5 with each other.

Figure 10:
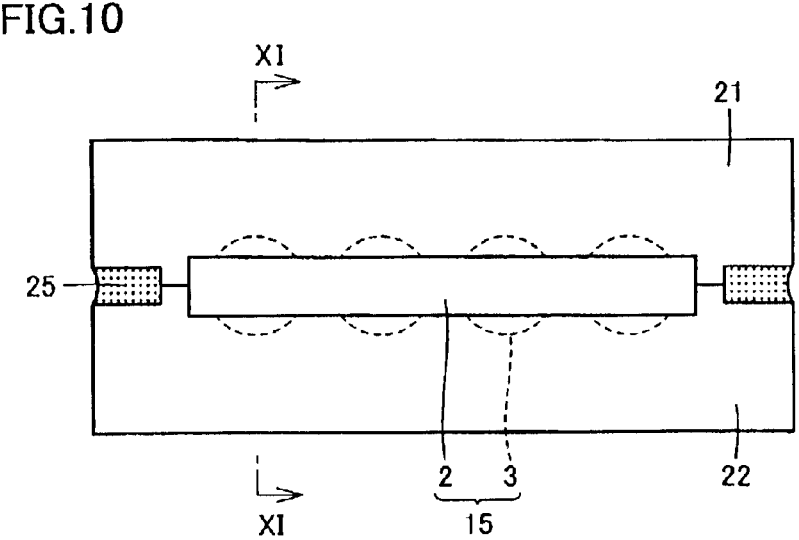
FIG. 10 illustrates an exemplary subassembly held between blocks in a step included in a method of manufacturing an optical switch according to a second embodiment of the present invention.
Figure 11:
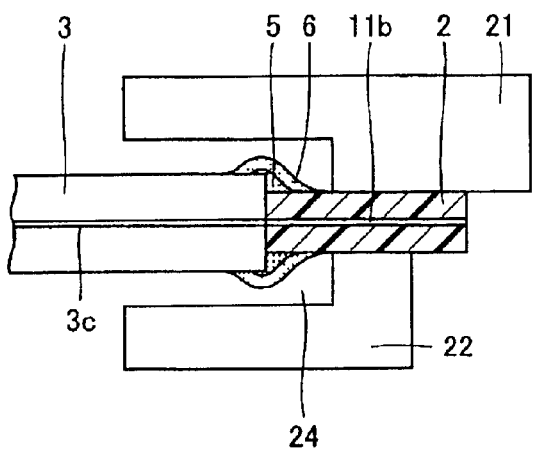
FIG. 11 is a sectional view taken along the line XI—XI in FIG. 10.

As shown in FIG. 10, the subassembly 15 is held between transparent blocks 21 and 22. FIG. 11 is a sectional view taken along the line XI-XI in FIG. 10. As shown in FIG. 11, the blocks 21 and 22 hold a connection member 2 of the subassembly 15 in a direct contact manner. However, the block 21 protrudes beyond the forward end of the connection member 2, while the block 22 is in contact with the connection member 2 on a position retracted from the forward end of the connection member 2. Referring to FIG. 11, the positional relation shown on the right side corresponds to this.

Figure 12:
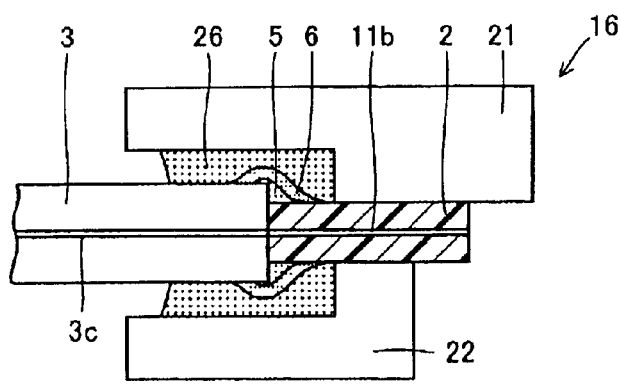
FIG. 12 is a sectional view of a connection waveguide unit obtained in a step included in the method of manufacturing an optical switch according to the second embodiment of the present invention.

As shown in FIG. 10, the blocks 21 and 22 are temporarily fixed with an adhesive 25. The adhesive 25 for bonding the blocks 21 and 22 to each other must not infiltrate at least into the clearance between the block 21 and the connection member 2 coming into contact with each other (see FIG. 11). As shown in FIG. 11, the blocks 21 and 22 are combined with each other to define a concave portion 24 storing the connected portions between the connection member 2 and each optical fiber member 3 in the subassembly 15. An adhesive 26 is charged into the concave portion 24 and hardened thereby further reinforcing the connected portions of the connection member 2 and the optical fiber member 3, as shown in FIG. 12. The overall such structure is referred to as a connection waveguide unit 16.

Figure 13:
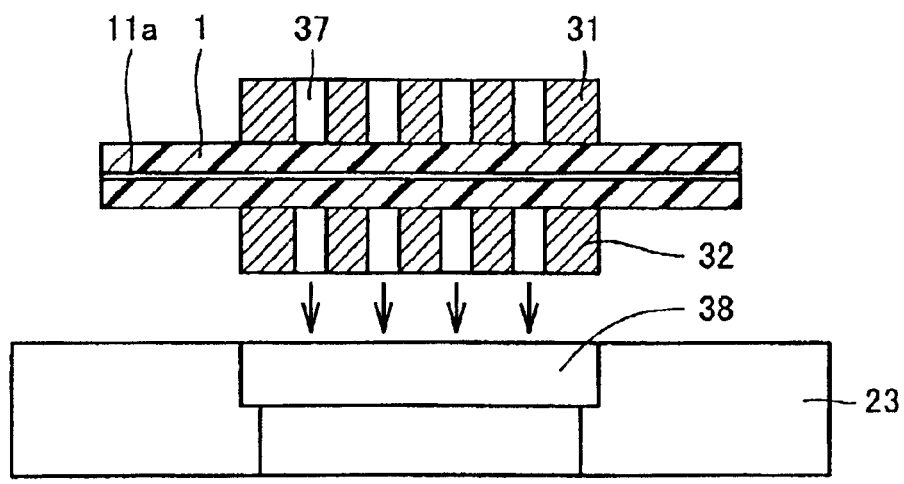
FIG. 13 is a first explanatory diagram of an operation of assembling an optical path switching unit performed in a step included in the method of manufacturing an optical switch according to the second embodiment of the present invention.
Figure 14:
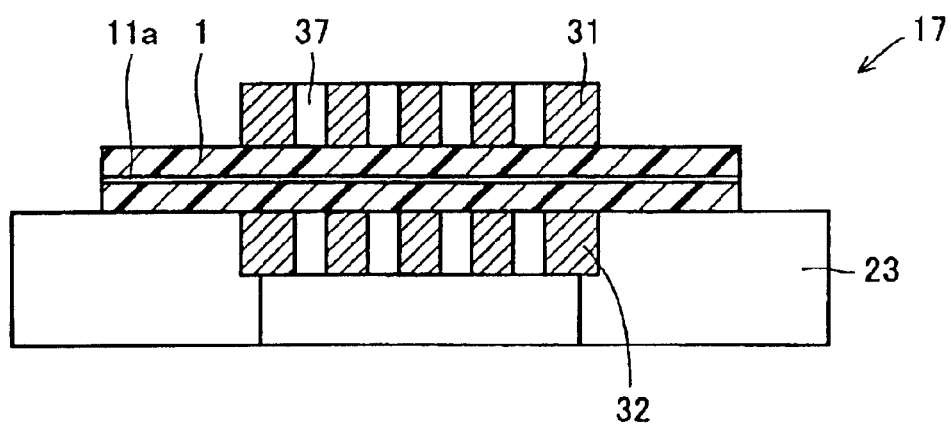
FIG. 14 is a second explanatory diagram of the operation of assembling the optical path switching unit performed in the step included in the method of manufacturing an optical switch according to the second embodiment of the present invention.

As shown in FIG. 13, on the other hand, the main member 1 is held between keep plates 31 and 32 from above and from below respectively, and engaged in a receptor 38 of a transparent block 23. The keep plates 31 and 32 have openings 37 on positions corresponding to notches 13 (see FIG. 4) formed on the surface of the main member 1. The receptor 38 formed by a depression provided on the upper surface of the block 23 has a shape corresponding to that of the keep plate 32. The block 23 protrudes beyond the main member 1 at least on the side connected with the subassembly 15. Referring to FIG. 14, the block 23 protrudes beyond the main member 1 on the left side. Thus, the block 23 holds the main member 1 and the keep plates 31 and 32 to define an optical path switching unit 17, as shown in FIG. 14.

Figure 15:
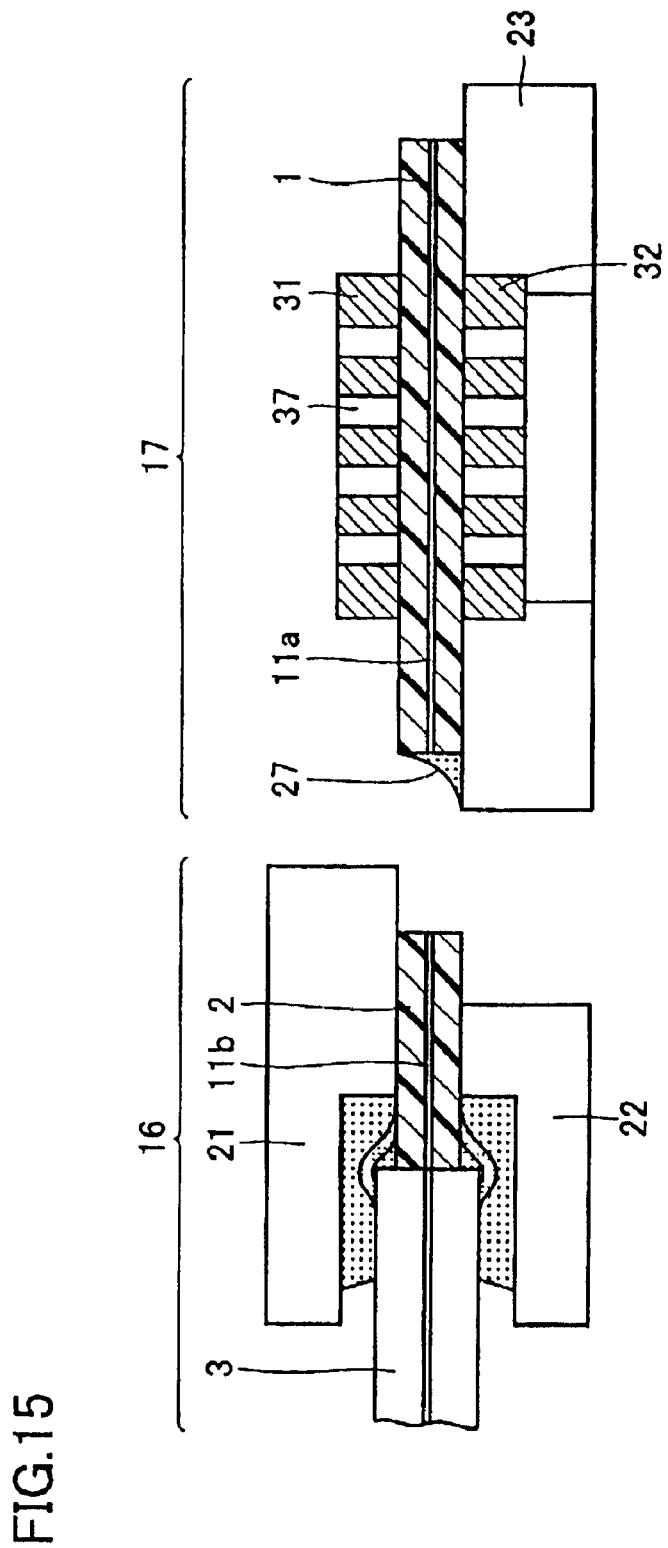
FIG. 15 is a first explanatory diagram of a step of connecting the optical path switching unit and the connection waveguide unit with each other performed according to the method of manufacturing an optical switch according to the second embodiment of the present invention.
Figure 16:
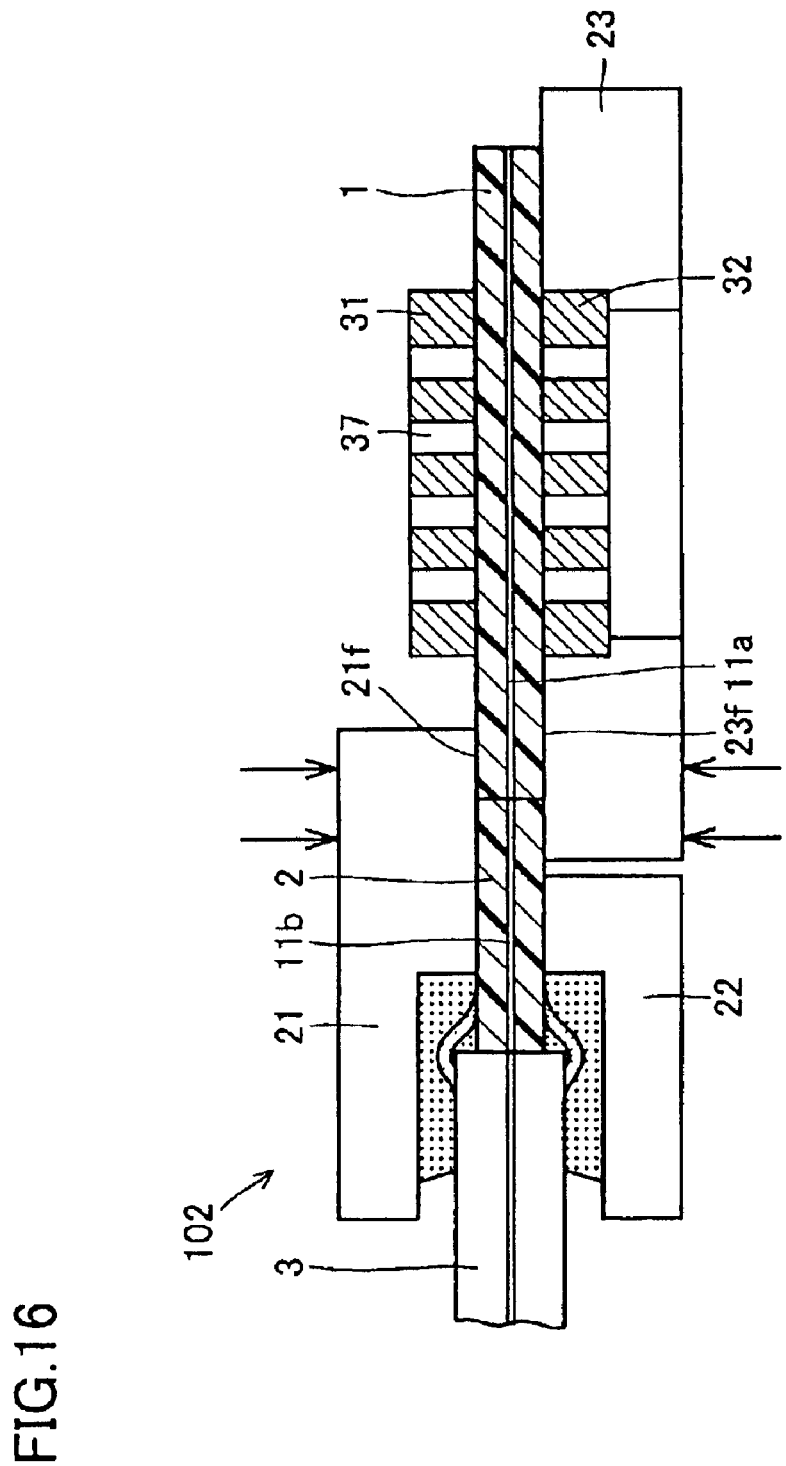
FIG. 16 is a second explanatory diagram of the step of connecting the optical path switching unit and the connection waveguide unit with each other performed according to the method of manufacturing an optical switch according to the second embodiment of the present invention.

The connection waveguide unit 16 and the optical path switching unit 17 are connected with each other as shown in FIGS. 15 and 16. A UV-cured or heat-hardening adhesive 27 is applied to an end surface of the optical switching unit 17 exposing each optical waveguide 11a as shown in FIG. 15, for combining the optical path switching unit 17 with the connection waveguide unit 16 as shown in FIG. 16. Horizontal alignment is performed through marks similar to the aforementioned marks 12 (see FIG. 9) or the like and pressure is applied from above and from below the units 16 and 17, for hardening the adhesive 27. Thus, an optical switch 102 is obtained.

The adhesive 27 may alternatively be applied not to the optical path switching unit 17 but to the connection waveguide unit 16. Further alternatively, the adhesive 27 may be applied to both units 16 and 17.

When the units 16 and 17 are held between the blocks 21 and 23 and pressed from above and below as shown in FIG. 16, surfaces 21f and 23f of the blocks 21 and 23 hold the main member 1 and the connection member 2 therebetween from above and from below respectively. The cross-directional positions of the main member 1 and the connection member 2, which are divided from a continuous member formed on the same substrate, automatically match with each other when held between the surfaces 2 if and 23f and pressed against each other. Consequently, optical waveguides 11a and 11b are also automatically aligned with each other.

According to this embodiment, members such as the blocks 21 and 23 are previously combined with the main member 1 and the connection member 2 respectively, whereby the main member 1 and the connection member 2 are reinforced and rendered easy to handle, to be readily correctly aligned with each other through a simple procedure.

According to the present invention, the main member and the connection members are divided from a continuous member to be reconnected with each other, whereby the optical waveguides can be readily correctly aligned with each other along the cross direction by a simple method, for rendering the optical switch easy to manufacture.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical switch comprising:

a sheet-type main member including a plurality of first optical waveguides linearly extending to intersect with each other on a plurality of intersections therein; and optical waveguide means, wherein said main member and said optical waveguide means are connected with each other through a connection member, said main member has notches provided to traverse said first optical waveguides, said connection member includes a plurality of second optical waveguides linearly extending for transferring optical signals between said first optical waveguides and said optical waveguide means therein, said main member and said connection member are divided from a member continuously formed on the same substrate, and said first optical waveguides and said second optical waveguides are obtained by dividing optical waveguides continuously formed on the same substrate.

2. The optical switch according to claim 1, wherein a mark for relatively aligning said main member and said connection member with each other is arranged on the connected portion between said main member and said connection member.

3. The optical switch according to claim 2, wherein said plurality of optical waveguides at least partially form an optical waveguide string including a plurality of optical waveguides arranged in parallel with each other at a regular pitch, and said mark is arranged on a position separated from endmost said optical waveguide as viewed from the cross direction of said optical waveguide string by at least half the pitch between said optical waveguides in said optical waveguide string.

4. The optical switch according to claim 1, wherein said main member and said connection member are bonded to each other by ultraviolet-cured resin.

5. The optical switch according to claim 4, wherein said ultraviolet-cured resin has a refractive index between the refractive index of said second optical waveguides and the refractive index of a light-transmitting portion of said optical waveguide means.

6. The optical switch according to claim 4, wherein the connected portion between said main member and said connection member is overcoated with an adhesive.

* * * * *